(12) United States Patent
Unterweger et al.

(10) Patent No.: US 11,817,037 B1
(45) Date of Patent: Nov. 14, 2023

(54) IMAGE STABILIZATION AND IMAGE PRESENTATION TECHNIQUES FOR PIXELATED VEHICLE HEADLAMPS

(71) Applicant: Infineon Technologies AG, Neubiberg (DE)

(72) Inventors: Gernot Unterweger, Latschach (AT); Adolfo De Cicco, Castel d'Azzano (IT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/937,301

(22) Filed: Sep. 30, 2022

(51) Int. Cl.
*G09G 3/20* (2006.01)
*H04N 9/31* (2006.01)
*G09G 3/32* (2016.01)

(52) U.S. Cl.
CPC .............. *G09G 3/2096* (2013.01); *G09G 3/32* (2013.01); *H04N 9/3179* (2013.01); *H04N 9/3194* (2013.01); *G09G 2320/0204* (2013.01); *G09G 2320/0233* (2013.01); *G09G 2320/0686* (2013.01); *G09G 2340/0435* (2013.01); *G09G 2340/0492* (2013.01); *G09G 2380/10* (2013.01)

(58) Field of Classification Search
CPC ................ G09G 3/2096; G09G 3/32; G09G 2320/0204; G09G 2320/0233; G09G 2320/0686; G09G 2340/0435; G09G 2340/0492; G09G 2380/10; H04N 9/3179; H04N 9/3194
See application file for complete search history.

(56) References Cited

U.S. PATENT DOCUMENTS

| | | | |
|---|---|---|---|
| 10,308,164 B2 * | 6/2019 | Sako | G08G 1/166 |
| 2012/0044090 A1 * | 2/2012 | Kahler | B60Q 1/245 340/905 |
| 2021/0063861 A1 * | 3/2021 | Okino | H04N 9/3147 |
| 2021/0162916 A1 * | 6/2021 | Ikenouchi | B60Q 1/143 |

* cited by examiner

*Primary Examiner* — Brent D Castiaux
(74) *Attorney, Agent, or Firm* — Shumaker & Sieffert, P.A.

(57) ABSTRACT

A method of controlling a vehicle headlamp that includes a plurality of LEDs may comprise receiving video images at a first frame rate; storing the video images in a memory at the first frame rate; receiving offset data associated with the video images; defining sub-images based on the offset data and the video images; and driving the plurality of LEDs to present the sub-images at a second frame rate, wherein the second frame rate is faster than the first frame rate.

25 Claims, 10 Drawing Sheets

IMAGE STABILIZATION AND IMAGE PRESENTATION TECHNIQUES FOR PIXELATED VEHICLE HEADLAMPS

TECHNICAL FIELD

This disclosure relates to circuits for driving and controlling pixelated light sources, such as for a vehicle headlamp comprising a matrix of light emitting diodes (LEDs) that are individually controllable.

BACKGROUND

Drivers are often used to control a voltage, current, or power at a load. For instance, a light emitting diode (LED) driver may control the power supplied to a set of light emitting diodes to control the light output. Some drivers may comprise a direct current (DC)-to-DC power converter, such as a buck-boost, buck, boost, or another DC-to-DC converter. Some drivers may comprise linear current sources that provide direct current to the LEDs based on a voltage supply. These or other types of LED drivers may be used to regulate current through LED strings. Pulse width modulation signals, for example, may define duty cycles for individual LEDs in order to control the light intensity that is output by the LEDs.

Some LED circuits include a large number of individually controllable LEDs arranged in a two-dimensional matrix. The individually controllable LEDs can be driven so as to provide different lighting (e.g., high beam or low beam lighting) for different driving conditions, or to provide advanced lighting effects. Advanced vehicle headlamp systems, for example, are one example application of such LED circuits, whereby lighting effects associated with vehicle operation can be used to improve the driving experience and to promote vehicle safety.

In some cases, a matrix of LEDs may be controlled by video signals, which may comprise images (e.g., bitmaps) that define the intensity values for each of the individual LEDs in the matrix. Stabilization of the light output by a matrix of LEDs can be challenging in moving vehicles, especially when image presentation is used, e.g., to present symbols, images, or road markings, or to achieve object illumination by the LEDs.

SUMMARY

This disclosure is directed to circuits used for controlling and driving a pixelated light source used for advanced vehicle headlamp systems, such as a matrix of light emitting diodes (LEDs) or another type of pixelated light source. The circuits and techniques may be used to control the LEDs so as to achieve image stabilization or imaging effects. According to this disclosure, video images are received and stored at a first frame rate. Offset data may be received at a faster rate than the video images, and sub-images can be defined from the video images based on the offset data. By using the sub-images to drive the matrix of LEDs, the frame rate can be increased to produce desirable results. In some examples, the techniques may be used to achieve image stabilization, and in other examples, the techniques may be used to achieve lighting effects such as a welcome light routine.

In one example, this disclosure describes a circuit (e.g., a driver circuit) configured to control a vehicle headlamp that includes a plurality of LEDs. The circuit comprises a memory and the circuit is configured to receive video images at a first frame rate and store the video images in the memory at the first frame rate. The circuit also includes a memory controller configured to: receive offset data, and define sub-images based on the offset data and the video images. The circuit may be configured to drive the plurality of LEDs to present the sub-images at a second frame rate, wherein the second frame rate is faster than the first frame rate.

In another example, this disclosure describes a method of controlling a vehicle headlamp that includes a plurality of LEDs. The method may comprise receiving video images at a first frame rate; storing the video images in a memory at the first frame rate; receiving offset data associated with the video images; defining sub-images based on the offset data and the video images; and driving the plurality of LEDs to present the sub-images at a second frame rate, wherein the second frame rate is faster than the first frame rate.

In another example, this disclosure describes a system comprising: a vehicle headlamp comprising a plurality of LEDs, and a circuit (e.g., a driver circuit) configured to control the LEDs. The circuit comprises a memory, wherein the circuit is configured to receive video images at a first frame rate and store the video images in the memory at the first frame rate. The circuit also comprises a memory controller configured to: receive offset data, and define sub-images based on the offset data and the video images, wherein the circuit is configured to drive the plurality of LEDs to present the sub-images at a second frame rate, wherein the second frame rate is faster than the first frame rate.

Details of these and other examples are set forth in the accompanying drawings and the description below. Other features, objects, and advantages will be apparent from the description and drawings, and from the claims.

DETAILED DESCRIPTION

This disclosure is directed to circuits and methods used for controlling and driving a pixelated light source used for advanced vehicle headlamp systems, such as a matrix of light emitting diodes (LEDs). The circuits and methods of this disclosure may be used to control the LEDs in a way that can control light output to achieve image stabilization or lighting effects. For example, rather than driving LEDs with an entire received image (i.e., a bitmap), the circuits and techniques may define sub-images (i.e., sub-bitmaps) based on the received images.

The sub-images may comprise a portion (some but not all) of the received images. Offset data may be defined, such as by motion sensors on the vehicle or by other means, and the sub-images can be defined as portions of the received images based on the offset data. Moreover, the offset data may be received at a faster rate than the received images such that the sub-images define a faster frame rate than the received images. Accordingly, by using the sub-images to drive the matrix of LEDs, the frame rate for driving the LEDs can be increased relative to the frame rate of received images, in order to produce desirable results.

In some examples, the techniques and circuits can achieve light stabilization or stabilization of images output by the LEDs. In these cases, for example, offset data may be defined by vehicle sensors, such as motion sensors (e.g., accelerometers) positioned on the vehicle. This can help to achieve image stabilization in the light or image output by the LEDs. Moreover, the motion sensors may already be present in the vehicle for other functions, such as for automated driving functions, safety monitoring, or other functions, and therefore, motion sensor data may already be available for use in the techniques described herein.

In other examples, the techniques and circuits can be used to achieve lighting effects, such as image presentation (e.g., a moving image or image routine) for a start-up or welcome light function. In these cases, for example, offset data may be pre-defined based on known content of the video images. According to some aspects of this disclosure, relatively simple image effects, such as a basic welcome light function or another lighting function, can be achieved without requiring complex computing power of a graphics processing unit (GPU).

Figure 1:
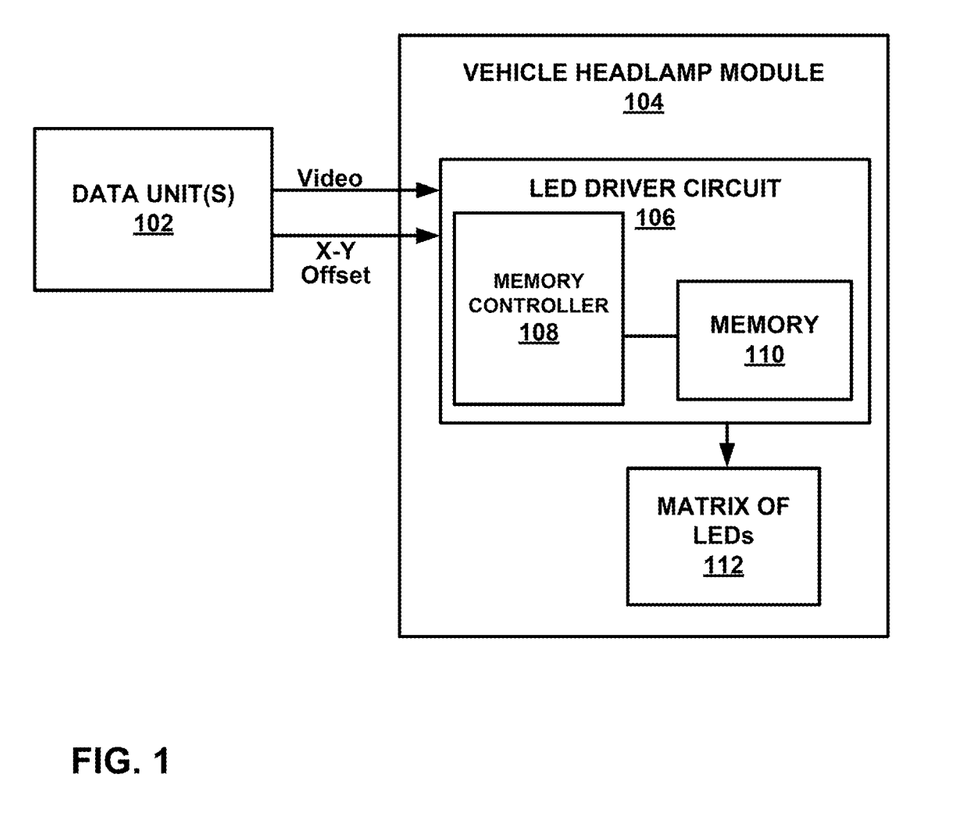
FIG. 1 is a block diagram illustrating a vehicle headlamp module that receives video data and offset data consistent with this disclosure.

FIG. 1 is a block diagram illustrating a vehicle headlamp module 104 that receives data from one or more data units 102 consistent with this disclosure. In particular, data units 102 may provide both video data and offset data to vehicle headlamp module 104. Video data may comprise captured video data form one or more cameras, processed video data from a GPU, or video images provided by a general-purpose processor or another device capable of providing video images to be used for LED illumination. As noted, some aspects of this disclosure may achieve lighting effects without the need for a GPU. However, the techniques of this disclosure may also be used on processed data from a GPU, especially when performing image stabilization.

In addition to video data, data units 102 may also provide offset data to vehicle headlamp module 104. The offset data may be pre-defined for particular images, or in some cases, the offset data may be defined based on sensor data captured by one or more sensors (e.g., accelerometers) associated with a vehicle.

LED driver circuit 106 may be configured to control a matrix of LEDs 112, which may correspond to a vehicle headlamp of vehicle headlamp module 104. Matrix of LEDs 112 may include a plurality of LEDs (e.g., thousands of LEDs) that are individually controllable. Video images (e.g., bitmaps or Red, Green, and Blue-RGB intensity values) may defined intensity values for the different LEDs of the matrix of LEDs 112. According to this disclosure, rather than directly using video image data to drive matrix of LEDs 112, offsets are used to define sub-images at from the video images, and the sub-images may define a faster frame rate than the video images. The sub-images can be used to drive matrix of LEDs 112, which can produce desirable effects such as image stabilization or functional lighting routines.

LED driver circuit 106 is one example of a circuit configured to control a vehicle headlamp that includes a plurality LEDs, e.g., matrix of LEDs 112. LED driver circuit 106 may comprise a memory 110, wherein LED driver circuit 106 is configured to receive video images at a first frame rate and store the video images in memory 110 at the first frame rate. Memory 110 may comprise one-time programmable memory (OTP), Flash memory, read-only memory (ROM), electrically erasable programmable read-only memory (EEPROM), erasable programmable read-only memory (EPROM), ferroelectric random access memory (RAM), a physical computer storage device, or any other computer storage capable of storing information in a non-volatile, permanent, or semi-permanent manner.

LED driver circuit 106 may also comprise a memory controller 108 configured to receive offset data, and define sub-images based on the offset data and the video images. LED driver circuit 106 is configured to drive a plurality LEDs, e.g., matrix of LEDs 112 to present the sub-images at a second frame rate, wherein the second frame rate is faster than the first frame rate. For example, the second frame rate may be more than twice as fast as the first frame rate. In some cases, the second frame rate may be more than three times as fast as the first frame rate, more than five times as fast as the first frame rate, or even faster.

In some cases, the video data and the X-Y offset data shown in FIG. 1 can be sent over two separate interfaces. A first interface of LED driver circuit 106 associated with the video data may be configured to receive the video data from a video source and a second interface of LED driver circuit 106 associated with the X-Y offset data may be configured to receive the offset data from one or more sensors. In other cases, a single video interface may be used, whereby LED driver circuit 106 is configured to receive the video data as a video stream from a video source in a line-by-line format, wherein the offset data is included as metadata in the video stream.

In some examples, video data from data units 102 may be used to define bitmaps that achieve advanced lighting effects, such as glare reduction, object detection, or lighting effects, and in some cases, cameras (not shown) may be used to capture the scene being illuminated by matrix of LEDs 112. Although some aspects of this disclosure may eliminate the need for GPU processing, in some cases, data units 102 may comprise a GPU to create bitmaps for driving matrix of LEDs 112.

GPU processing by data units 102, if used, may be based on navigation information collected or presented by the vehicle, based on object detection, or based on other factors. For example, camera sensors may deliver real time video in raw format and data units 102 may process the raw video to identify scenes, roadways, features, obstacles, or other elements within the raw video data. In some examples, a GPU within data unit 102 may perform one or more object detection algorithms on the raw video data in order to identify objects or elements within the video data captured by camera sensors. Based on such object detection algorithms, data units 102 may modify the raw video data so as to generate processed video data, and the processed video data may be modified relative to the raw video data in a way that can achieve desired lighting effects by matrix of LEDs 112. For example, object detection may be used to identify oncoming traffic, road hazards, or obstacles. Pixelated data adjustments by data unit 102 may adjust the raw video data in places where objects are detected in the field of view. In this way, the processed data itself may be changed in a way that can help to achieve lighting effects by matrix of LEDs 112, such as glare reductions perceived by the operators of other vehicles, illumination of one or more objects, presentation of visual aids or guiding elements in order to help the vehicle operator projections of one or more symbols, projections of guiding lines for the vehicle operator, light shaping, reductions in light intensity, presentation of symbols, shapes or symbols, or the presentation of other effects. Other desirable lighting effects may also include the illumination of Trademarks or symbols, such as for presenting the driver with a welcome message or lighting effects when the vehicle is started or when the vehicle is in a parked mode.

While data units 102 may comprise a GPU, some aspects of this disclosure may eliminate or reduce the need or desire for any GPU processing within data units 102. Indeed, in some examples, the techniques and circuits described herein can be used to achieve lighting effects, such as image presentation (e.g., a moving image or image routine) for a start-up or welcome light function without GPU processing capabilities. In these cases, for example, offset data may be pre-defined based on known content of the video images. In such cases, relatively simple image effects, such as a basic welcome light function or another lighting function, can be achieved without requiring complex computing power of a GPU. Also, the use of offset data to increase the image presentation rate relative to the rate of received video data can also be used for image stabilization as discussed herein.

Figure 2:
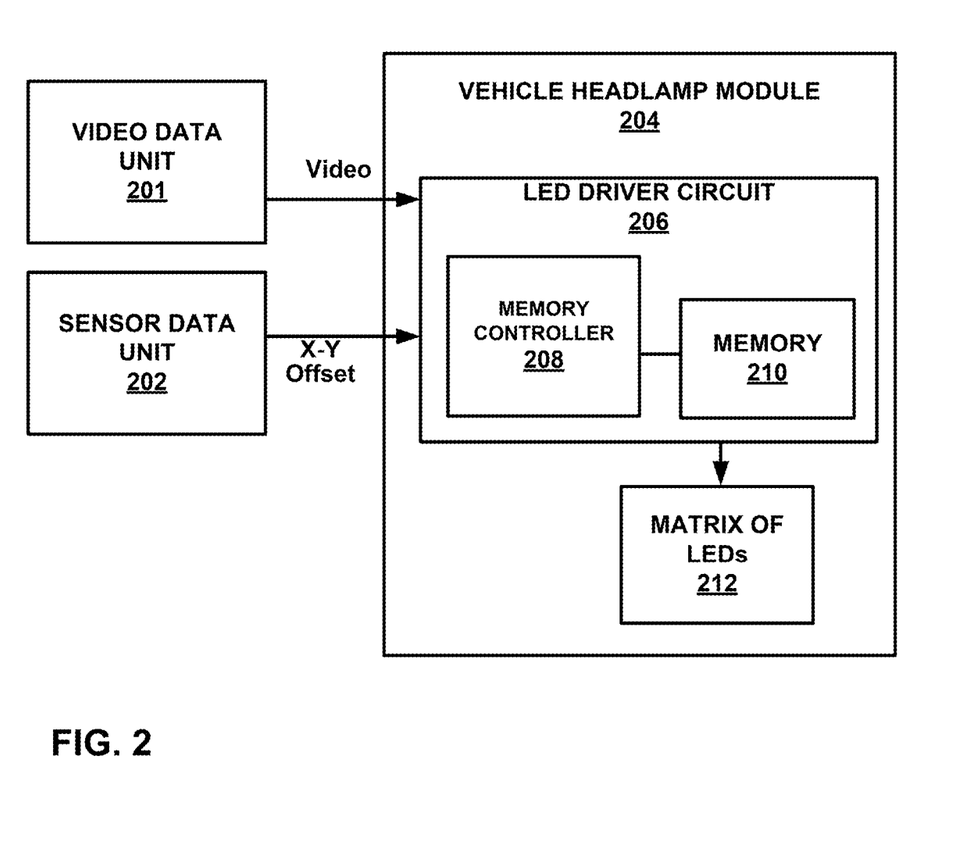
FIG. 2 is another block diagram illustrating a vehicle headlamp module that receives video data and offset data consistent with this disclosure.

FIG. 2 is another block diagram, and FIG. 2 is very similar to FIG. 1 in many respects. FIG. 2 specifically shows video data being sent from a video data unit 201 and X-Y offset data being sent from a sensor data unit 202. Sensor data unit 202, for example, may comprise one or more vehicle sensors, such as accelerometers, that can generate X-Y offset data specially for the purpose of image stabilization.

As shown in FIG. 2, vehicle headlamp module 204 receives video data from a video data unit 201 and X-Y offset data from a sensor data unit 202. Video data unit 201 may comprise one or more cameras, a GPU, a general processor, or another device capable of providing video images to be used for LED illumination. Again, in some cases, the techniques of this disclosure may eliminate or reduce the need for complex video processing and may therefore eliminate or reduce the need for video processing by a GPU.

The X-Y offset data from sensor unit 202 may be defined based on sensor data captured by one or more motion sensors (e.g., accelerometers) associated with a vehicle. According to this disclosure, in some cases, the X-Y offset data can be used to define sub-images that can achieve image stabilization of images or light projected by matrix of LEDs 212. In some case, the stabilization may define vertical stabilization in the Y direction. In some cases, the stabilization may define horizontal stabilization in the X direction. In some cases, the stabilization may define both vertical stabilization in the Y direction and horizontal stabilization in the X direction.

LED driver circuit 206 may be configured to control the matrix of LEDs 212, which may correspond to a vehicle headlamp of vehicle headlamp module 204. Similar to the discussion above for FIG. 1, in FIG. 2, matrix of LEDs 212 may include a plurality of LEDs (e.g., thousands of LEDs) that are individually controllable. Video images (e.g., bitmaps) may defined intensity values for the different LEDs of the matrix of LEDs 212. According to this disclosure, rather than using video image data to drive matrix of LEDs 212 directly, X-Y offsets are used to define sub-images at from the video images, and the sub-images may define a faster frame rate than the video images. The sub-images can be used to drive matrix of LEDs 112, which can produce image stabilization as discussed in greater detail below.

LED driver circuit 206 of FIG. 2 is one example of a circuit configured to control a vehicle headlamp that includes a plurality LEDs, e.g., matrix of LEDs 212. LED driver circuit 206 comprises a memory 210, wherein LED driver circuit 206 is configured to receive video images at a first frame rate and store the video images in memory 210 at the first frame rate. Memory 210 may comprise OTP, Flash memory, ROM, EEPROM, EPROM, ferroelectric RAM, a physical computer storage device, or any other computer storage capable of storing information in a non-volatile, permanent, or semi-permanent manner.

LED driver circuit 206 also comprises a memory controller 208 configured to receive offset data, and define sub-images based on the offset data and the video images. LED driver circuit 206 is configured to drive a plurality LEDs, e.g., matrix of LEDs 212 to present the sub-images at a second frame rate, wherein the second frame rate is faster than the first frame rate.

Figure 3:
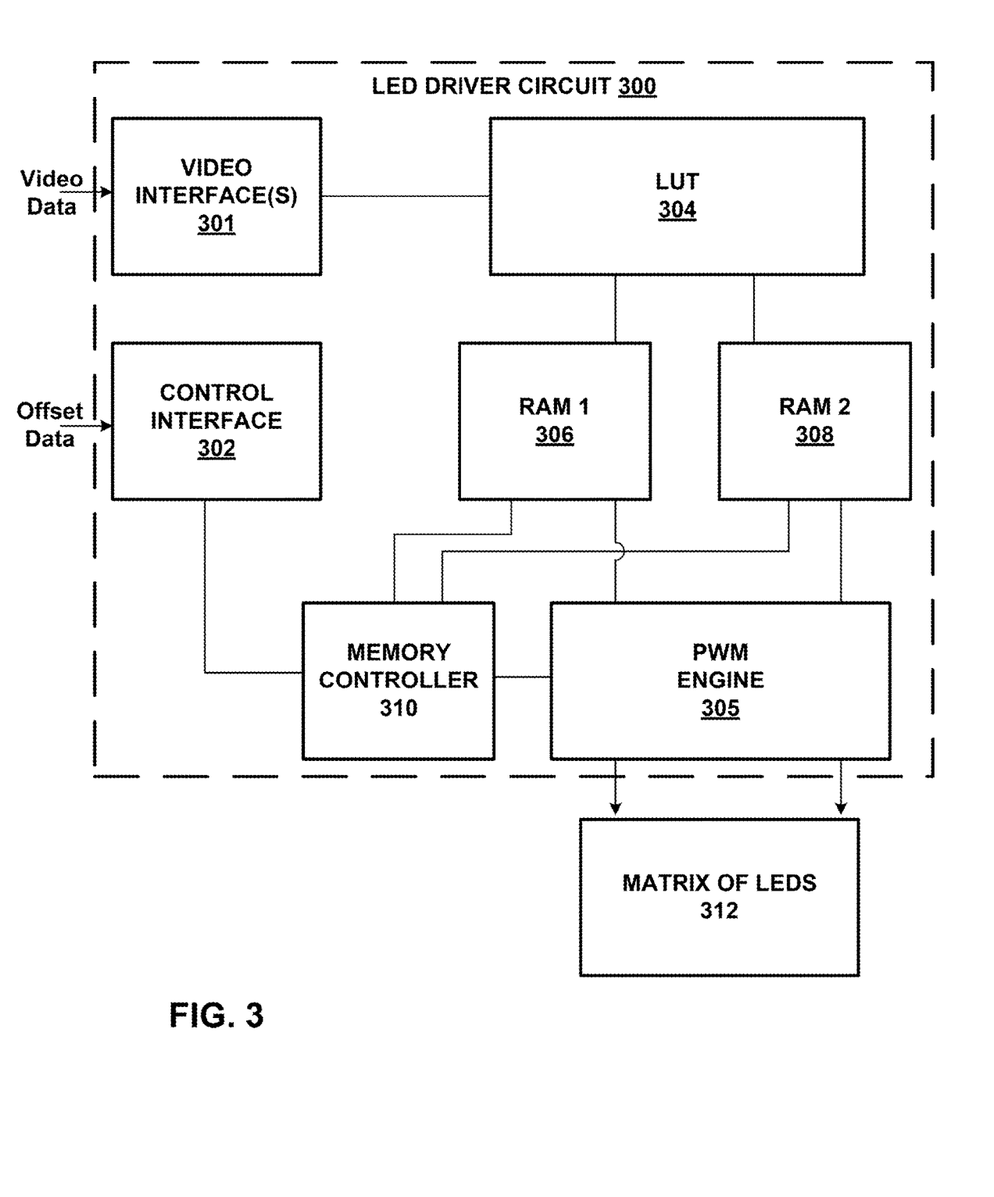
FIG. 3 is block diagram showing an example vehicle headlamp module showing one example of an LED driver circuit consistent with this disclosure.

FIG. 3 is block diagram showing an example vehicle headlamp module showing one example of an LED driver circuit 300 configured to control a matrix of LEDs 312 consistent with this disclosure. The example LED driver circuit 300 includes one or more video interfaces 301 configured to receive video data. The one or more video interfaces 301 may comprise a red-green-blue (RGB) interface, a serial peripheral interface (SPI), a video universal asynchronous receiver/transmitter (V-UART) interface, or another type of interface capable of receiving video data. A lookup table (LUT) 304 may map 8-bit intensity values of the video images to 10-bit values, although other bit depths may be used. The video images (e.g., the images with 10-bit values) may be stored in memory for use in driving matrix of LEDs 312. More specifically, in the example of FIG. 3, the memory may comprise random access memory (RAM) 1 (306) and RAM 2 (308). The two-memory architecture shown in FIG. 3 may be useful for LED driving, whereby RAM 1 306 is loaded with a new image, when RAM 2 308 is used for driving matrix of LEDs 312. Then, once RAM 1 306 is loaded, RAM 1 306 can be used for driving matrix of LEDs 312 while RAM 2 308 is re-loaded with the next image. In this way, the two-memory architecture shown in FIG. 3 may be useful to facilitate receiving video images and using the video images efficiently for driving matrix of LEDs 312.

In addition to video interfaces 301 configured to receive video data, LED driver circuit 300 may include another interface, e.g., control interface 302 configured to receive offset data. However, it is also possible to eliminate the separate control interface and interleave the offset data as meta data within a video file, e.g., between lines of video image.

Offset data received over control interface 302 may be defined motion sensors on the vehicle (e.g., one or more accelerometers) or by other means. For example, offset data may provide information useful to achieve image stabilization in driving matrix of LEDs. Memory controller 310 may be configured to receive the offset data, and define sub-images based on the offset data and the current video image stored in RAM 1 or RAM 2. The video images loaded and stored in RAM 1 and RAM 2 may be received at a video frame rate, but the offset data received over control interface 302 may be received at a different rate, i.e., a faster rate than the video frame rate. Memory controller 310 may be configured to define sub-images (e.g., portions of the received images stored in RAM 1 or RAM 2) based on the offset data. Since the offset data is received at a faster rate than the received images, the sub-images define a faster frame rate than the received images. Accordingly, by using the sub-images to drive the matrix of LEDs, the frame rate for driving the LEDs can be increased relative to the frame rate of received images, in order to produce desirable results.

Pulse width modulation (PWM) engine 305 may define width modulation signals based on the intensity values in the sub-images in order to control the duty cycles of each of the LEDS in matrix of LEDs 312. Other types of modulation signals, such as pulse density modulation signals, may also be used based on the sub-images defined by the offsets and the stored video images. In this way, LED driver circuit 300 can increase the ON/OFF rate of LEDs in a manner that is faster than the frame rate of the received video data.

Again, in some examples, the techniques and circuits can achieve light stabilization or stabilization of images output by the LEDs. In these cases, for example, offset data may be defined by vehicle sensors, such as motion sensors (e.g., accelerometers) positioned on the vehicle. This can help to achieve image stabilization in the light or image output by the LEDs. Moreover, the motion sensors may already be present in the vehicle for other functions, such as for automated driving functions, safety monitoring, or other functions, and therefore, motion sensor data may already be available for use in the techniques described herein.

Figure 4:
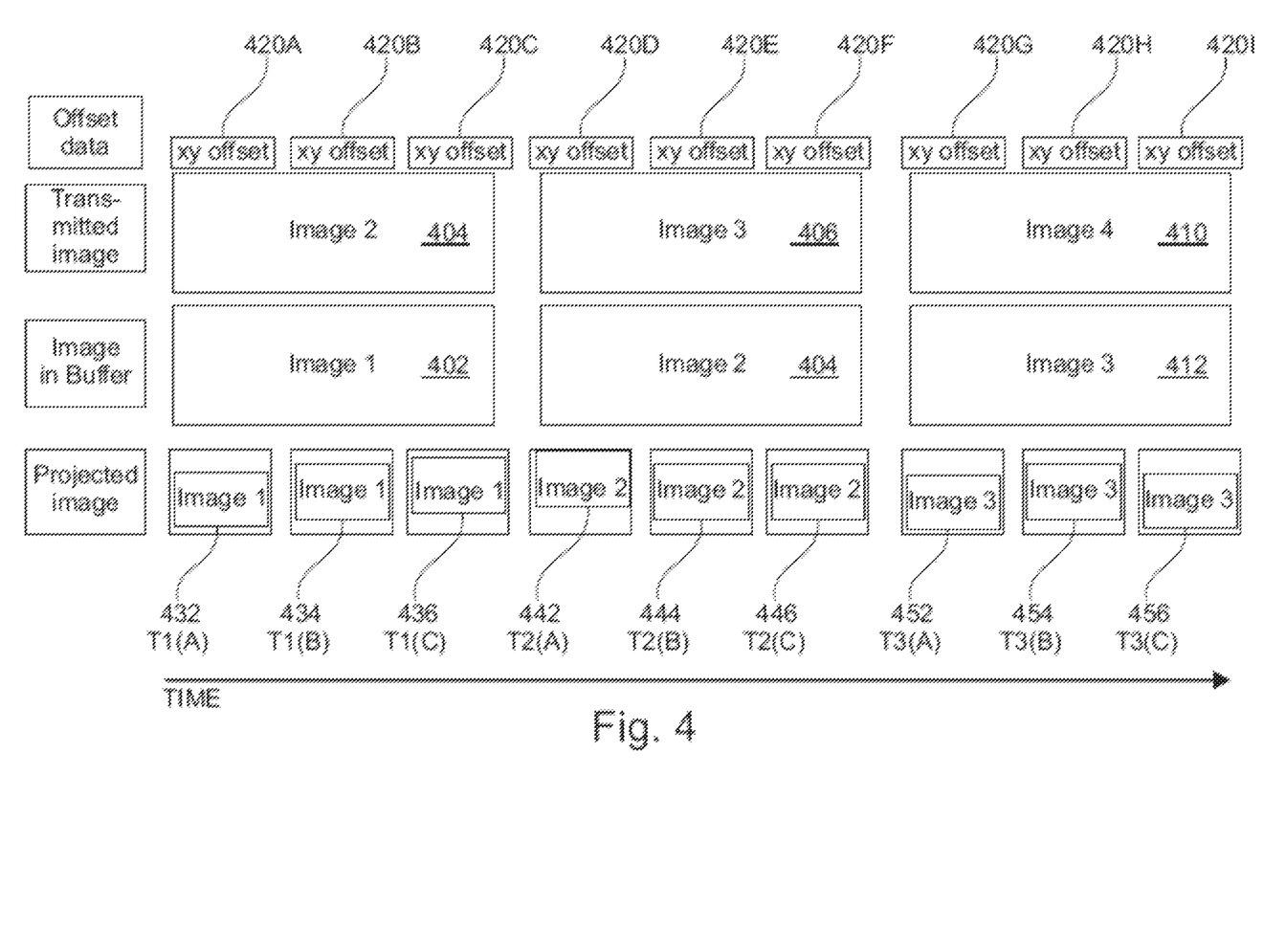
FIG. 4 is conceptual diagram showing stored images that are stored at a first frame rate and presented images that are defined by offset data and presented at a second frame rate consistent with this disclosure.

FIG. 4 is a conceptual diagram showing stored images that are stored at a first frame rate and presented images that are defined by offset data and presented at a second frame rate consistent with this disclosure. In particular, FIG. 4 illustrates how the techniques of this disclosure can help achieve images stabilization of images presented by vehicle headlamps.

FIG. 4 illustrates a time scale from time T1(A) associated with sub-image 432 to time T3(C) associated with sub-image 456. Images 402, 404, 408, 408, 410, 412 are received at a video frame rate (i.e., a first rate). The illustration of FIG. 4 is consistent with the two-memory circuit architecture shown in FIG. 3. During time T1(A)-T1(C), a first image 402 that is stored in a first memory buffer (i.e., RAM 1 306) is used for image presentation while a second image 404 is being transmitted to and received by a second memory (i.e., RAM 2 308). Then, during time T2(A)-T2(C), second image 404 stored in the second memory buffer (i.e., RAM 2 308) is used for image presentation while a third image 406 is being transmitted to and received by the first memory (i.e., RAM 1 306). Then, during time T3(A)-T3(C), third image 406 that is stored in the first memory buffer (i.e., RAM 1 306) is used for image presentation while a fourth image 408 is being transmitted to and received by a second memory (i.e., RAM 2 308).

In addition to receiving images 402, 404, 408, 408, 410, 412 at a first rate, as shown in FIG. 4, offset data 420A-420I is also received. More specifically, offset data 420A-420I is received at a second rate, which is faster than the first rate associated with images 402, 404, 408, 408, 410, 412. The received offset data may be based on motion sensors (e.g., one or more accelerometers associated with a vehicle). By defining sub-images 432, 434, 436 based on stored image 402 in an image buffer, the presentation and output rate of light of headlamps can be increased to correspond to the second rate, which is faster than the rate of received video frames. Moreover, with offset data defined based on motion sensors, image stabilization can be achieved in the light output, e.g., to account for vehicle movement while driving.

In the example shown in FIG. 4, sub-images 432, 434, 436 can be used for headlamp control. During times T1(A), T1(B), and T1(C), each of sub-images 432, 434, 436 is defined as a portion of first image 402, and sub-images 432, 434, 436 are used for headlamp control. Sub-images 432, 434, 436 may comprise slightly different portions of first image 402 in order to account for vehicle movement so as to achieve image stabilization as perceived by the user (i.e., the driver and or passengers of the vehicle). The images and sub-images, for example, may include road symbols, guidelines, projection arrows, or other desirable symbols, and by using the sub-images at the faster frame rate defined by offset data, better stabilization of the symbols can be achieved.

Similarly, during times T2(A), T2(B), and T2(C), each of sub-images 442, 444, 446 is defined as a portion of second image 404, and sub-images 442, 444, 446 are used for headlamp control. Sub-images 442, 444, 446 may comprise slightly different portions of second image 404 in order to account for vehicle movement so as to achieve image stabilization as perceived by the user. Then, during times T3(A), T3(B), and T3(C), each of sub-images 452, 454, 456 is defined as a portion of third image 406, and sub-images 452, 454, 456 are used for headlamp control. Sub-images 452, 454, 456 may comprise slightly different portions of third image 406 in order to account for vehicle movement so as to achieve image stabilization as perceived by the user.

Symbols projected on the road by vehicle headlamps are generally "moving" on the road as the headlamp is following the car movements (due to uneven road surface, acceleration, braking, passenger movement, or other factors). For improved user experience, it is desirable for image or symbol projection to stay at a defined distance in front of the car, independent of the vehicle movement. To achieve this, however, some beam leveling may be needed. Mechanical leveling or leveling inside the video stream (typical 60 Hz to 100 Hz) is typically not sufficient to fully remove the effects. Therefore, a faster offset compensation is desirable.

Some video signals for a vehicle headlamp may be received at a relatively low video frequency (e.g., 60 frames per second) via a first interface. Stabilization offset information (which may comprise angular sensor data), may be transmitted and received at higher frequency (200 Hz-1 kHz) via a second interface or possibly as meta data within the video stream. A pixelated light source, such as matrix of LEDs may be capable of operating at high frequency (e.g., 200 Hz-2 kHz).

In some examples, the techniques of this disclosure can provide a relatively simple solution for achieving embed image stabilization in matrix LED light sources for vehicle headlamps. The brightness of pixels in a matrix LED light source may be constantly refreshed at high speed (several 100 Hz) out of lower speed buffers (60 Hz) that receive video data at the lower speed. At each refresh, the light source control circuit performs image stabilization using adjustable memory access. The light source control circuit receives X and Y offset parameters embedded in the video stream or via a second interface. The X and Y offset parameters may comprise coordinate values that define a vertical (Y) and horizontal (X) positions of a sub-image within a larger video image. In some examples, the size of the sub-image is predefined as a sub-set of a video image, and the X and Y offset parameters may define the position of particular pixel (e.g., the lower-left pixel of the sub-image).

Headlamp control circuits (e.g., LED driver circuit 300) may include a video interface 301 for receiving video data. The received video data may be alternately loaded in RAM Buffers 306, 308. The buffers can be switched when an image has been fully received, e.g., RAM 1 306 may be loaded with a new image when RAM 2 308 is used for driving the matrix of LEDs 312. Then, once RAM 1 306 is loaded, RAM 1 306 can be used for driving matrix of LEDs 312 while RAM 2 308 is re-loaded with the next image.

Additionally, the light source circuit (e.g., LED driver circuit 300) receives offset data via a second interface (e.g., control interface 302). The offset data may be stored in a register or may directly trigger PWM refresh by PWM engine 306 when received.

The techniques of this disclosure may provide various advantages. In some examples, no additional computing power is needed (e.g., no additional processing core or GPU) for the image stabilization. In some examples, no additional memory buffer or core (other than the two-memory architecture shown in FIG. 3) may be needed to achieve image levelling or stabilization. In some cases, depending on the amount of levelling needed, the memory buffer size may need a slight increase (e.g., from 100 k pixels to 110 k pixels). However, it is also possible for PWM engine 306 to fill some regions with zeros (dark pixels), e.g., for image locations above a horizon line, in which case there may be no increase of memory buffer size. In general, the techniques of this disclosure may achieve beam leveling or symbol stabilization without significant increase in circuit area, which can help reduce circuit costs.

In some cases, PWM engine 305 constantly refreshes the duty cycles of LEDs at defined high frequency (200 -2000 Hz) out of the currently active image buffer using the offset data. In this case, a fixed frequency may trigger refresh cycles. In some examples, PWM engine 305 refreshes the duty cycles of LEDs based on data in a currently active memory buffer using current offset data when the offset data has been received. In this case, a receiving command by memory controller 310 associated with receiving offset data may define the trigger for a refresh cycle by PWM engine 305.

In some examples, rather than sending data via a separate control interface, the offset data may be transmitted as meta data embedded in the video stream or alternatively provided. Also, offset data could even be locally defined from a local sensor (not shown) within LED driver circuit 300.

As an alternative to leveling or symbol stabilization, the techniques of this disclosure may also be used to achieve low-cost variants of pixel light routines or applications, such as welcome lighting effects. For example, upon receiving a video stream, a static light distribution can be received and then animated by updating the offset data (e.g., moving a symbol or image upward, downward, or left and right). In this case, the video images (for different symbols/light distributions) used can be statically stored in a local memory of an LED driver circuit, or within another memory and sent on demand. This means that no graphic computing power needs to be forecasted to achieve a lighting effect. Automobile manufacturers may decide whether to equip higher-level automobiles with the GPU and full dynamics and lower-level automobile without GPU and less functionality. In other words, the techniques of this disclosure may provide a way to achieve low-cost, low-functionality lighting effects without the need for a GPU. For example, the described features can be used to generate a welcome and goodbye animation using one or more pictures and animation using the X-Y offset data (similar to conventional screensavers). The offset data and picture may be provided a central electric control unit (ECU) of the vehicle or local microprocessor associated with the headlamp control circuit.

In some examples, a welcome light function can be achieved by storing one or many images in the light source and animate/move the images using a defined series of X-Y offset parameters. Both data can be stored in the light source or an external memory. This feature can work without needing any additional software in a central processing unit (CPU), a GPU, or a microcontroller, outside the LED control circuit.

In still other examples, a horizontal offset can be used to generate a cornering light, e.g., by moving the light output left and right without changing the light function. Moreover, in cases where the beam shape is not changed but only the beam is stabilized, the video generation and transmission can be stopped or the frame rate may be reduced to a minimum frame rate (e.g., a few fps instead of 60 fps). In this case, GPU/CPU and busload reductions may be achieved on a system level, which can result in reductions of power dissipation. Such techniques that reduce the video frame rate may be useful for many application cases (as long no animation is needed or an adaptive drive beam tunnel is required).

Figure 5:
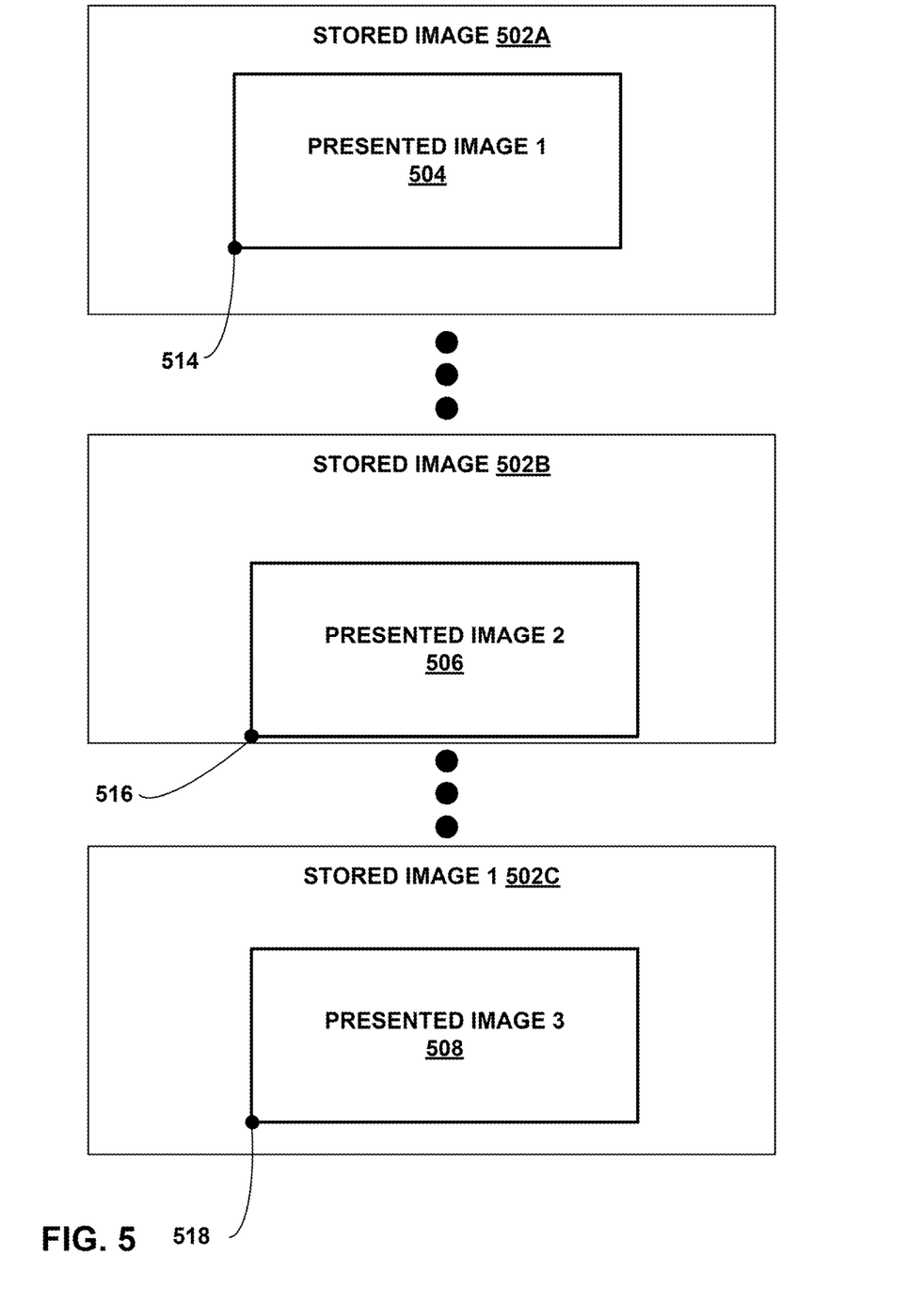
FIGS. 5-7 are conceptual diagrams a stored image and presented images that are defined by offset data consistent with this disclosure.
Figure 6:
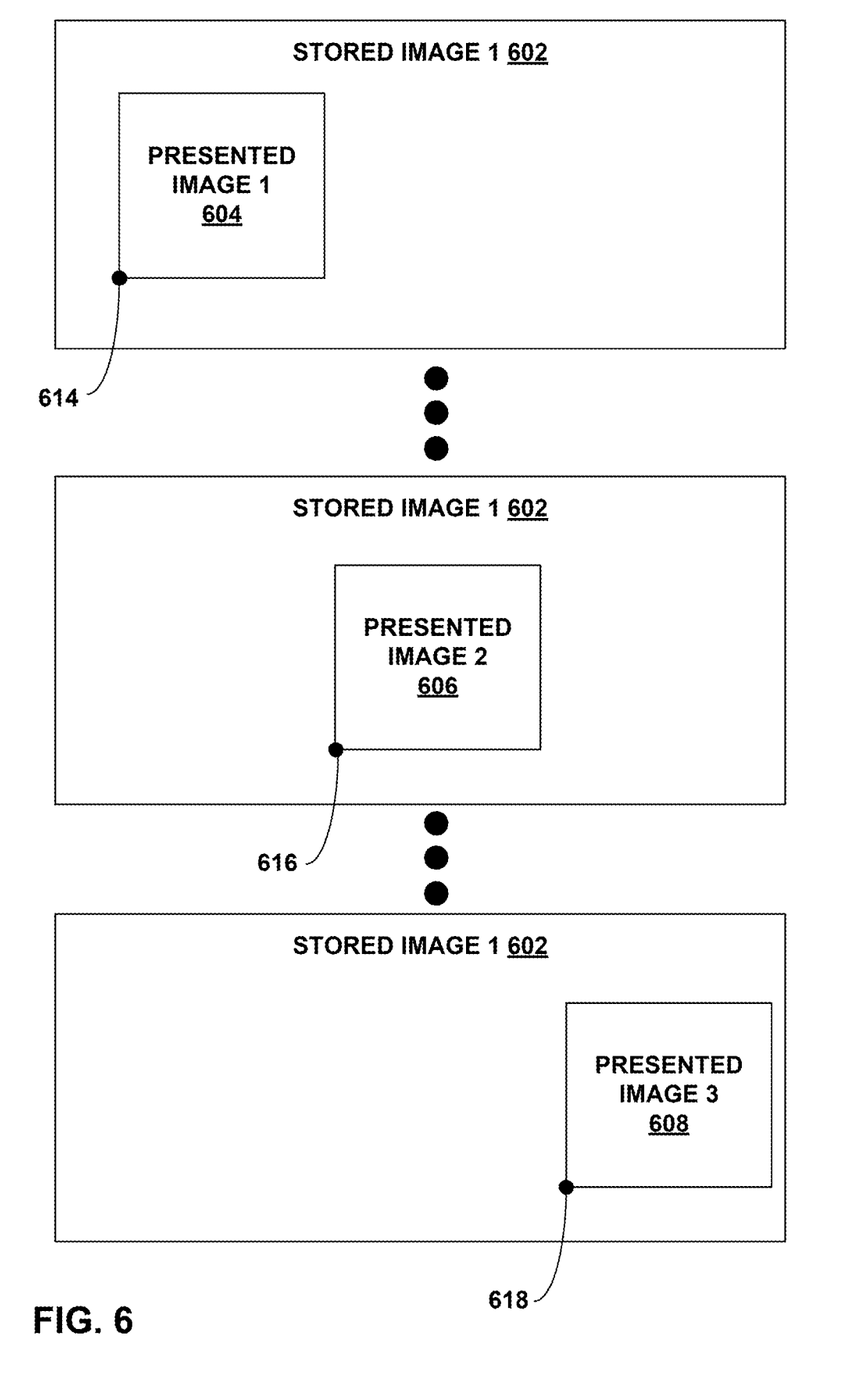
Figure 7:
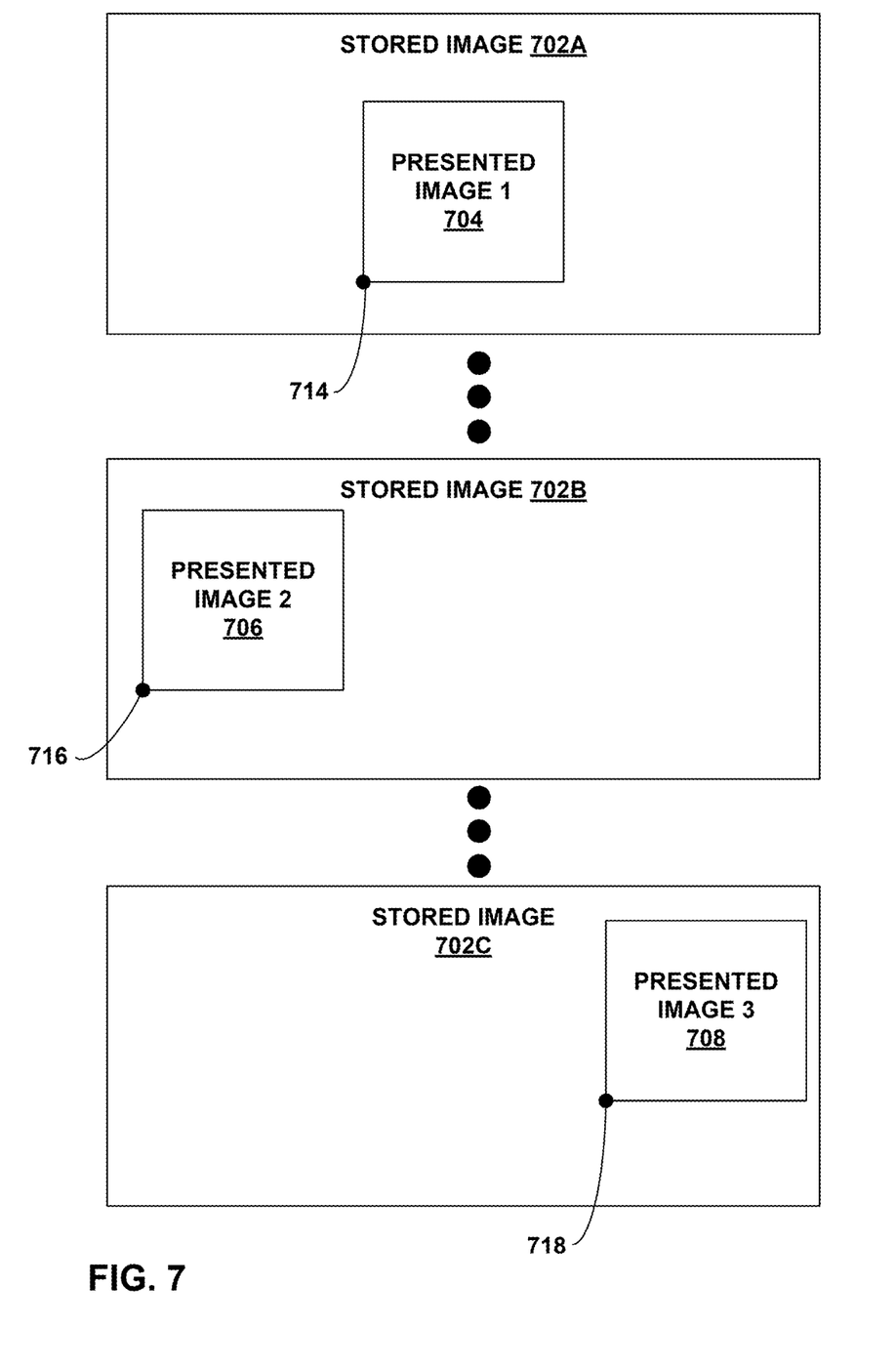

FIGS. 5-7 are conceptual diagrams a stored image and presented images that are defined by offset data consistent with this disclosure. In the example of FIG. 5, a stored image is shown three times a stored image 502A, 502B, and 502C. Each stored image 502A, 502B, and 502C shown in FIG. 5 is the same image and will be generally referred to as stored image 502. Presented images 504, 506, and 508 may define different subsets of stored image 502. X-Y offset data 514, 516, and 518 define different starting pixel locations within stored image 502, which can help stabilize light output. For this example, X-Y offset data 514, 516, and 518 may be based on vehicle motion sensor data. The different presented images 504, 506, and 508 may have data overlap with other presented images 504, 506, and 508.

In the example of FIG. 6, a stored image is shown three times a stored image 602A, 602B, and 602C. Each stored image 602A, 602B, and 602C shown in FIG. 6 is the same image and will be generally referred to as stored image 602. Presented images 604, 606, and 608 may define different subsets of stored image 602, without any data overlap. X-Y offset data 614, 616, and 618 define different starting pixel locations within stored image 602, which can be used to define a moving symbol, such as for a lighting routine, welcome lighting, corner lighting, or another effect. For this example, stored image 602 may have a pre-defined content, and X-Y offset data 614, 616, and 618 may be pre-defined to create a lighting effect based on the pre-defined content of stored image 602.

In the example of FIG. 7, a stored image is shown three times a stored image 702A, 702B, and 702C. Each stored image 702A, 702B, and 702C shown in FIG. 7 is the same image and will be generally referred to as stored image 702. Presented images 704, 706, and 708 may define different subsets of stored image 702, without any data overlap. X-Y offset data 714, 716, and 718 define different starting pixel locations within stored image 702, which can be used to define a moving symbol that jumps around, such as for a lighting routine, welcome lighting, or another effect. For this example, stored image 702 may have a pre-defined content, and X-Y offset data 714, 716, and 718 may be pre-defined to create a lighting effect based on the pre-defined content of stored image 702.

Figure 8:
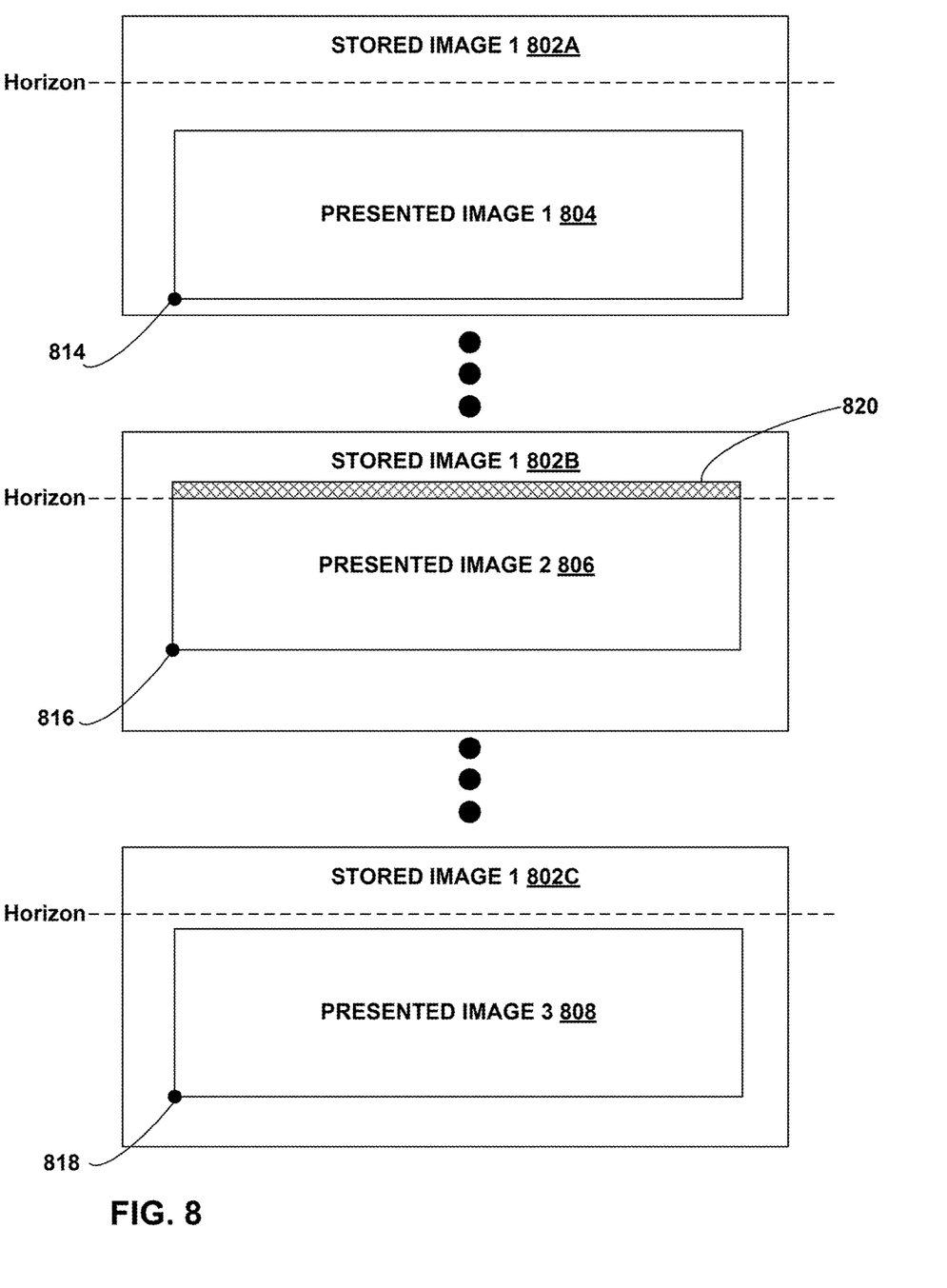
FIG. 8 is another conceptual diagram showing a stored image and presented images that are defined by offset data, where at least some of the presented images include images include a dark region defined above a horizon consistent with this disclosure.

FIG. 8 is another conceptual diagram showing a stored image 802 and presented images 804, 806, 808 that are defined by offset data, where at least some of the presented images include images include a dark region 820 defined above a horizon consistent with this disclosure. FIG. 8 is similar to FIG. 5 in many respects, but FIG. 8 shows the addition of a defined horizon, above which all pixels are dark within dark region 820. This can improve user experience and possibly avoid glare to oncoming traffic.

In the example of FIG. 8, a stored image is shown three times as stored image 802A, 802B, and 802C. Each stored image 802A, 802B, and 802C shown in FIG. 8 is the same and generally referred to as stored image 802. Presented images 804, 806, and 808 may define different subsets of stored image 802, and the different presented images 804, 806, and 808 may have data overlap with other presented images 804, 806, and 808. X-Y offset data 814, 816, and 818 define different starting pixel locations within stored image 802, which can help stabilize light output. Moreover, as noted above, FIG. 8 shows a defined horizon, above which all pixels are dark within dark region 820. This can improve user experience and possibly avoid glare to oncoming traffic. In this case, one of the presented images, i.e., presented image 2 802B includes dark region 802. Like the example of FIG. 5, in the example of FIG. 8, X-Y offset data 814, 816, and 818 may be based on vehicle motion sensor data to achieve image stabilization or leveling.

Figure 9:
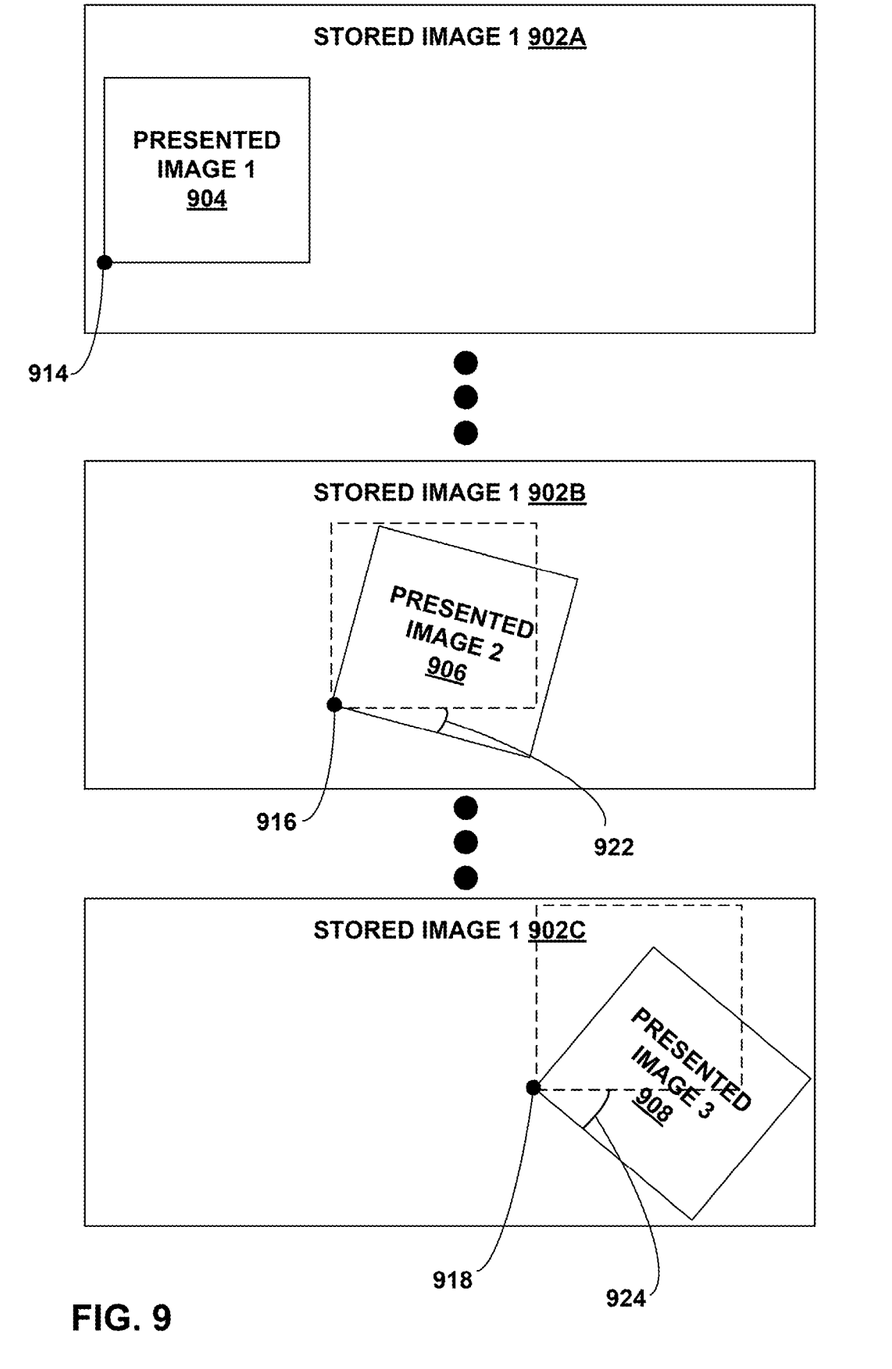
FIG. 9 is another conceptual diagram showing a stored image and presented images that are defined by offset data and a rotational metric.

FIG. 9 is another conceptual diagram showing a stored image 902 and presented images 904, 906, 908 that are defined by offset data and one or more rotational metrics 922, 924. FIG. 9 is similar to FIG. 6 in many respects, but FIG. 9 shows the addition of rotational metrics 922, 924 that define a level or rotation of presented images 906 and 908 respectively.

In the example of FIG. 9, a stored image is shown three times as stored image 902A, 902B, and 902C. Each stored image 902A, 902B, and 902C shown in FIG. 9 is the same and generally referred to as stored image 902. Presented images 904, 906, and 908 may define different subsets of stored image 902, and moreover, at least some of the presented images, i.e., presented images 906 and 908, are rotated according to rotational metrics 922, 924. Rotational metrics 922, 924, for example, may comprise angular values indicative of a level or rotation for each of presented images presented 906 and 908. In some examples, LED driver circuit 206, 300 may include some graphics processing circuity (not shown) capable of rotating presented images 906 and 908 based on rotational metrics 922, 924. Alternatively, LUT 304 may include rotational mappings corresponding to rotational metrics 922, 924 in order to define different LED locations in a way that achieves image rotation in presented images 906 and 908, in which case image rotational effects may be achieved without the need for graphics processing.

Figure 10:
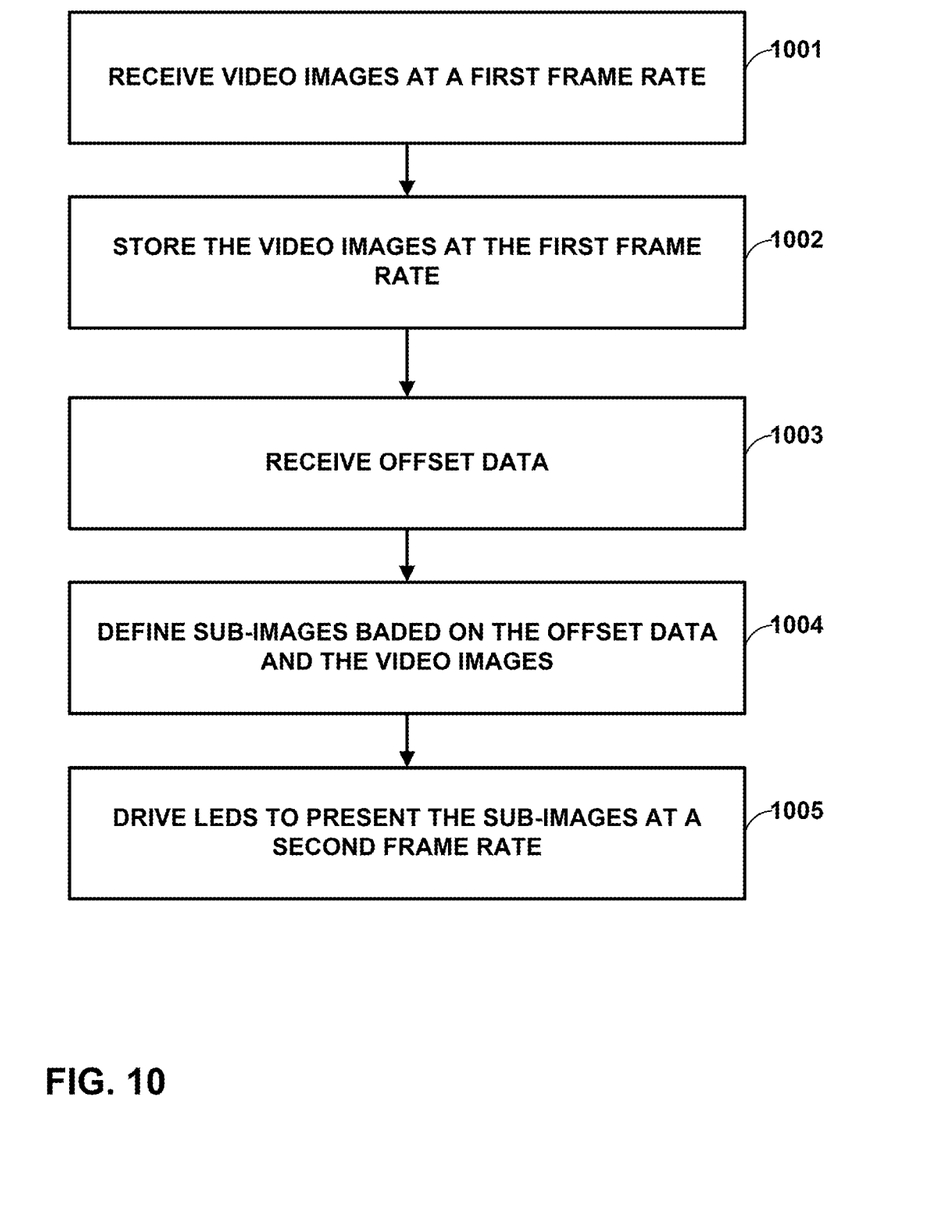
FIG. 10 is a flow diagram showing one example method of this disclosure.

FIG. 10 is a flow diagram showing one example method of controlling a vehicle headlamp that includes a plurality of light emitting diodes consistent with this disclosure. The method of FIG. 10 may be performed by an LED driver circuit, and FIG. 10 will be described from the perspective of driver circuit 300, although other driver circuits (such as driver circuit 106 or 206) could perform the method.

As shown in FIG. 10, video interface 301 of LED driver circuit 300 receives video images at a first frame rate (1001). Driver circuit 300 stores the video images in memory (RAM 1 or RAM 2) at the first frame rate (1002). Optionally, LUT 304 may be applied to map received values to other bit depths, or possibly to create rotational effects.

Control interface 302 of LED driver circuit 300 receives offset data (1003), and the offset data may define a faster rate than the first frame rate associated with the received video data. Memory controller 310 of driver circuit 300 defines sub-images based on the offset data and the stored video images (1004). PWM engine 305 of driver circuit 300 drives a plurality of LEDs (1005), e.g., matrix of LEDS 312, in order to present the sub-images at a second frame rate, wherein the second frame rate is faster than the first frame rate. For example, the second frame rate may be more than twice as fast as the first frame rate. The second frame rate, for example, may be defined by the offset data.

As described herein, the offset data may comprise X-Y offset data defined by information from one or more motion sensors associated with a vehicle in order to provide horizontal and or vertical stabilization of presented images. In this case, the sub-images may comprise stabilized images that are stabilized based on the offset data. Motion sensor information can provide a useful measurement of vehicle motion, in order to help account for movement of the image that is due to motion of the vehicle. Therefore, by defining the X-Y offset data based on information from one or more motion sensors, and then using that X-Y offset data to define sub-images that are different subsets of a larger image, image and light stabilization of projected light defined by the sub-images can improve light output by vehicle headlamps.

In some cases, at least some of the sub-images may include a dark region defined above a horizon, such as shown presented image 806 of FIG. 8. In some cases, the sub-images may include one or more symbols that are stabilized based on the offset data.

In some examples, driver circuit 300 includes a first interface (e.g., one or more video interfaces 301) configured to receive the video data from a video source a second interface (e.g., control interface 302) configured to receive the offset data from one or more sensors. In other examples, a driver circuit may comprise a single interface (e.g., a video interface) configured to receive the video data as a video stream from a video source in a line-by-line format, wherein the offset data is included as metadata in the video stream.

As explained in greater detail above, in some cases, the techniques can achieve light stabilization or stabilization of images output by the LEDs. In these cases, for example, offset data may be defined by vehicle sensors, such as motion sensors (e.g., accelerometers) positioned on the vehicle. This can help to achieve image stabilization in the light or image output by the LEDs. Moreover, the motion sensors may already be present in the vehicle for other functions, such as for automated driving functions, safety monitoring, or other functions, and therefore, motion sensor data may already be available for use in the techniques described herein.

In other examples, the techniques and circuits can be used to achieve lighting effects or a functional lighting routine, such as image presentation (e.g., a moving image, a moving symbol, or image routine) for a start-up or welcome light function. In these cases, for example, offset data may be pre-defined based on known content of the video images. According to some aspects of this disclosure, relatively simple image effects, such as a basic welcome light function or another lighting function, can be achieved without requiring complex computing power of a GPU.

The following clauses may illustrate one or more aspects of the disclosure.

Clause 1—A circuit configured to control a vehicle headlamp that includes a plurality of LEDs, the circuit comprising: a memory, wherein the circuit is configured to receive video images at a first frame rate and store the video images in the memory at the first frame rate; and a memory controller configured to: receive offset data; and define sub-images based on the offset data and the video images, wherein the circuit is configured to drive the plurality of LEDs to present the sub-images at a second frame rate, wherein the second frame rate is faster than the first frame rate.

Clause 2—The circuit of clause 1, wherein the offset data comprises X-Y offset data defined by information from one or more motion sensors associated with a vehicle.

Clause 3—The circuit of clause 1 or 2, wherein the sub-images are stabilized images that are stabilized based on the offset data.

Clause 4—The circuit of any of clauses 1-3, wherein at least some of the sub-images include a dark region defined above a horizon.

Clause 5—The circuit of any of clauses 1-4 wherein the sub-images include one or more symbols that are stabilized based on the offset data.

Clause 6—The circuit of any of clauses 1-5, further comprising a first interface configured to receive the video data from a video source and a second interface configured to receive the offset data from one or more sensors.

Clause 7—The circuit of any of clauses 1-5, further comprising a video interface configured to receive the video data as a video stream from a video source in a line-by-line format, wherein the offset data is included as metadata in the video stream.

Clause 8—The circuit of clause 1, 5, 6, or 7, wherein the sub-images define a functional lighting routine.

Clause 9—The circuit of clause 1, 5, 6, 7, or 8, wherein the sub-images define a moving symbol.

Clause 10—The circuit of any of clauses 1-9, wherein the memory includes two or more memory units configured to receive and store the video images in an alternating manner at the first frame rate.

Clause 11—The circuit of any of clauses 1-10, wherein the second frame rate more than twice as fast as the first frame rate.

Clause 12—The circuit of any of clauses 1 or 5-11, wherein the offset data comprises X-Y offset data and a rotational metric, and wherein the sub-images define a rotating image.

Clause 13—A method of controlling a vehicle headlamp that includes a plurality of LEDs, the method comprising: receiving video images at a first frame rate; storing the video images in a memory at the first frame rate; receiving offset data associated with the video images; defining sub-images based on the offset data and the video images; and driving the plurality of LEDs to present the sub-images at a second frame rate, wherein the second frame rate is faster than the first frame rate.

Clause 14—The method of clause 13, further comprising: defining the offset data based on information from one or more motion sensors associated with a vehicle.

Clause 15—The method of clause 13 or 14, wherein the sub-images are stabilized images that are stabilized based on the offset data.

Clause 16—The method of any of clauses 13-15, wherein at least some of the sub-images include a dark region defined above a horizon.

Clause 17—The method of any of clauses 13-16, wherein the sub-images include one or more symbols that are stabilized based on the offset data.

Clause 18—The method of any of claims 13-17, further comprising receiving the video data from a video source and receiving the offset data from one or more sensors.

Clause 19—The method of any of clauses 13-17, further comprising receiving the video data as a video stream from a video source in a line-by-line format, wherein the offset data is included as metadata in the video stream.

Clause 20—The method of clause 13, 18, or 19, wherein the sub-images define a functional lighting routine.

Clause 21—The method of clause 13, 18, 19, or 20, wherein the sub-images define a moving symbol.

Clause 22—The method of any of clauses 13-21, wherein the memory includes two or more memory units, the method further comprising receiving and storing the video images in an alternating manner in the two or more memory units at the first frame rate.

Clause 23—The method of any of clauses 13-22, wherein the second frame rate more than twice as fast as the first frame rate.

Clause 24—A system comprising: a vehicle headlamp comprising a plurality of LEDs; and a circuit configured to control the LEDs, the circuit comprising: a memory, wherein the circuit is configured to receive video images at a first frame rate and store the video images in the memory at the first frame rate; and a memory controller configured to: receive offset data; and define sub-images based on the offset data and the video images, wherein the circuit is configured to drive the plurality of LEDs to present the sub-images at a second frame rate, wherein the second frame rate is faster than the first frame rate.

Clause 25—The system of clause 24, further comprising one or more motion sensors, wherein the offset data comprises X-Y offset data defined by information from the one or more motion sensors.

In order to perform techniques of this disclosure, in some examples, a memory controller may comprise computer-readable instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. In addition, in some aspects, the functionality described herein may be provided within dedicated hardware and/or software modules configured to perform the techniques of this disclosure. Also, the techniques could be fully implemented in one or more circuits or logic elements.

Various systems, devices, circuits, methods, and features have been described in this disclosure. These and other systems, devices, circuits, methods and features are within the scope of the following claims.

The invention claimed is:

1. A circuit configured to control a vehicle headlamp that includes a plurality of light emitting diodes (LEDs), the circuit comprising:
a memory, wherein the circuit is configured to receive video images at a first frame rate and store the video images in the memory at the first frame rate; and
a memory controller configured to:
receive offset data; and
define sub-images based on the offset data and the video images;

wherein the circuit is configured to drive the plurality of LEDs to present the sub-images at a second frame rate, wherein the second frame rate is faster than the first frame rate.

2. The circuit of claim 1, wherein the offset data comprises X-Y offset data defined based on information from one or more motion sensors associated with a vehicle.

3. The circuit of claim 1, wherein the sub-images are stabilized images that are stabilized based on the offset data.

4. The circuit of claim 1, wherein at least some of the sub-images include a dark region defined above a horizon.

5. The circuit of claim 1, wherein the sub-images include one or more symbols that are stabilized based on the offset data.

6. The circuit of claim 1, further comprising a first interface configured to receive the video data from a video source and a second interface configured to receive the offset data from one or more sensors.

7. The circuit of claim 1, further comprising a video interface configured to receive the video data as a video stream from a video source in a line-by-line format, wherein the offset data is included as metadata in the video stream.

8. The circuit of claim 1, wherein the sub-images define a functional lighting routine.

9. The circuit of claim 1, wherein the sub-images define a moving symbol.

10. The circuit of claim 1, wherein the memory includes two or more memory units configured to receive and store the video images in an alternating manner at the first frame rate.

11. The circuit of claim 1, wherein the second frame rate more than twice as fast as the first frame rate.

12. The circuit of claim 1, wherein the offset data comprises X-Y offset data and a rotational metric, and wherein the sub-images define a rotating image.

13. A method of controlling a vehicle headlamp that includes a plurality of light emitting diodes (LEDs), the method comprising:
    receiving video images at a first frame rate;
    storing the video images in a memory at the first frame rate;
    receiving offset data associated with the video images;
    defining sub-images based on the offset data and the video images; and
    driving the plurality of LEDs to present the sub-images at a second frame rate, wherein the second frame rate is faster than the first frame rate.

14. The method of claim 13, further comprising:
    defining the offset data based on information from one or more motion sensors associated with a vehicle.

15. The method of claim 13, wherein the sub-images are stabilized images that are stabilized based on the offset data.

16. The method of claim 13, wherein at least some of the sub-images include a dark region defined above a horizon.

17. The method of claim 13, wherein the sub-images include one or more symbols that are stabilized based on the offset data.

18. The method of claim 13, further comprising receiving the video data from a video source and receiving the offset data from one or more sensors.

19. The method of claim 13, further comprising receiving the video data as a video stream from a video source in a line-by-line format, wherein the offset data is included as metadata in the video stream.

20. The method of claim 13, wherein the sub-images define a functional lighting routine.

21. The method of claim 13, wherein the sub-images define a moving symbol.

22. The method of claim 13, wherein the memory includes two or more memory units, the method further comprising receiving and storing the video images in an alternating manner in the two or more memory units at the first frame rate.

23. The method of claim 13, wherein the second frame rate more than twice as fast as the first frame rate.

24. A system comprising:
    a vehicle headlamp comprising a plurality of light emitting diodes (LEDs); and
    a circuit configured to control the LEDs, the circuit comprising:
    a memory, wherein the circuit is configured to receive video images at a first frame rate and store the video images in the memory at the first frame rate; and
    a memory controller configured to:
    receive offset data; and
    define sub-images based on the offset data and the video images;
    wherein the circuit is configured to drive the plurality of LEDs to present the sub-images at a second frame rate, wherein the second frame rate is faster than the first frame rate.

25. The system of claim 24, further comprising one or more motion sensors, wherein the offset data comprises X-Y offset data defined based on information from the one or more motion sensors.

* * * * *